US007178891B2

(12) United States Patent
Takamiya

(10) Patent No.: US 7,178,891 B2
(45) Date of Patent: Feb. 20, 2007

(54) PRINT CONTROL APPARATUS, PRINT CONTROL METHOD, PRINT SYSTEM, AND PROGRAM

(75) Inventor: Hiroyoshi Takamiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 10/674,494

(22) Filed: Oct. 1, 2003

(65) Prior Publication Data

US 2004/0066424 A1 Apr. 8, 2004

(30) Foreign Application Priority Data

Oct. 2, 2002 (JP) ............................ 2002-290042
Sep. 9, 2003 (JP) ............................ 2003-316939

(51) Int. Cl.
*B41J 29/38* (2006.01)
*G06F 15/00* (2006.01)

(52) U.S. Cl. ................. 347/5; 347/9; 347/14; 358/1.8; 358/1.9

(58) Field of Classification Search ............... 358/3.28, 358/1.2, 1.5; 715/517
See application file for complete search history.

(56) References Cited

U.S. PATENT DOCUMENTS 4,843,405 A * 6/1989 Morikawa et al. .......... 347/224
5,316,396 A * 5/1994 Fukaya ........................ 400/76
5,748,860 A * 5/1998 Shively ..................... 358/1.15
5,848,430 A * 12/1998 Takakura et al. ........... 715/521
6,292,270 B1 * 9/2001 Schwarz et al. ............ 358/1.9
6,401,141 B1 * 6/2002 Kumler ....................... 710/10
6,559,971 B1 * 5/2003 Watts et al. ................ 358/1.2
6,580,521 B1 * 6/2003 Nishikawa et al. ........ 358/1.18
6,734,986 B1 * 5/2004 Kuroi et al. .............. 358/1.16
6,820,962 B2 * 11/2004 Uchida ........................ 347/36
6,834,929 B1 * 12/2004 Adams et al. ................ 347/19
6,965,451 B1 * 11/2005 Ogg et al. .................. 358/1.8
6,991,327 B2 * 1/2006 Goto et al. .................. 347/96
2003/0095277 A1 * 5/2003 Murakawa et al. ........ 358/1.14
2004/0046817 A1 * 3/2004 Kato et al. .................... 347/15

* cited by examiner

*Primary Examiner*—Manish Shah
*Assistant Examiner*—Shelby Fidler
(74) *Attorney, Agent, or Firm*—Fitzpatrick, Cella, Harper & Scinto

(57) ABSTRACT

To provide a print system which can cope with both of the specification of the conventional PDL and the specification of the new PDL, in which print mode the printing is executed is selected between a first print mode for drawing by setting a position that is away from a sheet edge by a specified offset to an origin and a second print mode for drawing by setting the sheet edge to the origin, and processes are executed in the selected print mode.

15 Claims, 16 Drawing Sheets

PROCESSES OF PRINTER CONTROLLER

FIG. 16

| COMMAND | FUNCTION |
|---|---|
| MOVE x, y | SET DRAWING START POINT TO (x, y) |
| LINE TO dx, dy | DRAW STRAIGHT LINE FROM PRESENT COORDINATES TO (+dx, +dy) |
| SET MODE | SET TO MODE SHOWN BY "MODE" |

PRINT CONTROL APPARATUS, PRINT CONTROL METHOD, PRINT SYSTEM, AND PROGRAM

BACKGROUND OF THE INVENTION

1. Field of the Invention

The invention relates to a print control apparatus, a print control method, a print system, and a computer-readable program.

2. Related Background Art

In recent years, various digital copying apparatuses have been spread. A system such that various interface apparatuses are connected to the digital copying apparatus and image data can be outputted from a host computer has been developed.

Hitherto, a blank of a sheet is specified as a language specification of a PDL on the basis of image forming ability of a printer engine and a drawing origin of printing is positioned inside of the blank portion of the sheet, thereby realizing a print result without a missing part of an image. Since the same result can be obtained even when drawing data formed in the past is printed by a subsequent apparatus, reusability of the data is consequently improved.

However, in recent years, although a larger print area can be realized in association with improvement of performance of the printer engine, since there is a specification of the conventional PDL, the improvement of the performance of the printer engine cannot be effectively utilized. Needs of the user have been diversified. There is a demand for a technique that allows the user to print an image to an area as large as possible even if a missing part is caused in the image as a result.

SUMMARY OF THE INVENTION

The invention is made in consideration of the above drawback and it is an object of the invention to provide a print control apparatus, a print control method, a print system, and a program which can cope with the conventional specification and a new specification.

To accomplish the above object, according to the invention, there is provided a print control apparatus comprising: selecting means for selecting in which print mode printing is executed between a first print mode for drawing by setting a position that is away from a sheet edge by a specified offset to an origin and a second print mode for drawing by setting the sheet edge to the origin; and processing means for processing in the print mode selected by the selecting means.

BRIEF DESCRIPTION OF THE DRAWINGS

FIG. 16 is a diagram for explaining functions of the commands.

DETAILED DESCRIPTION OF THE PREFERRED EMBODIMENTS

Embodiments of the invention will be described hereinbelow.

(Embodiment 1)

Figure 1:
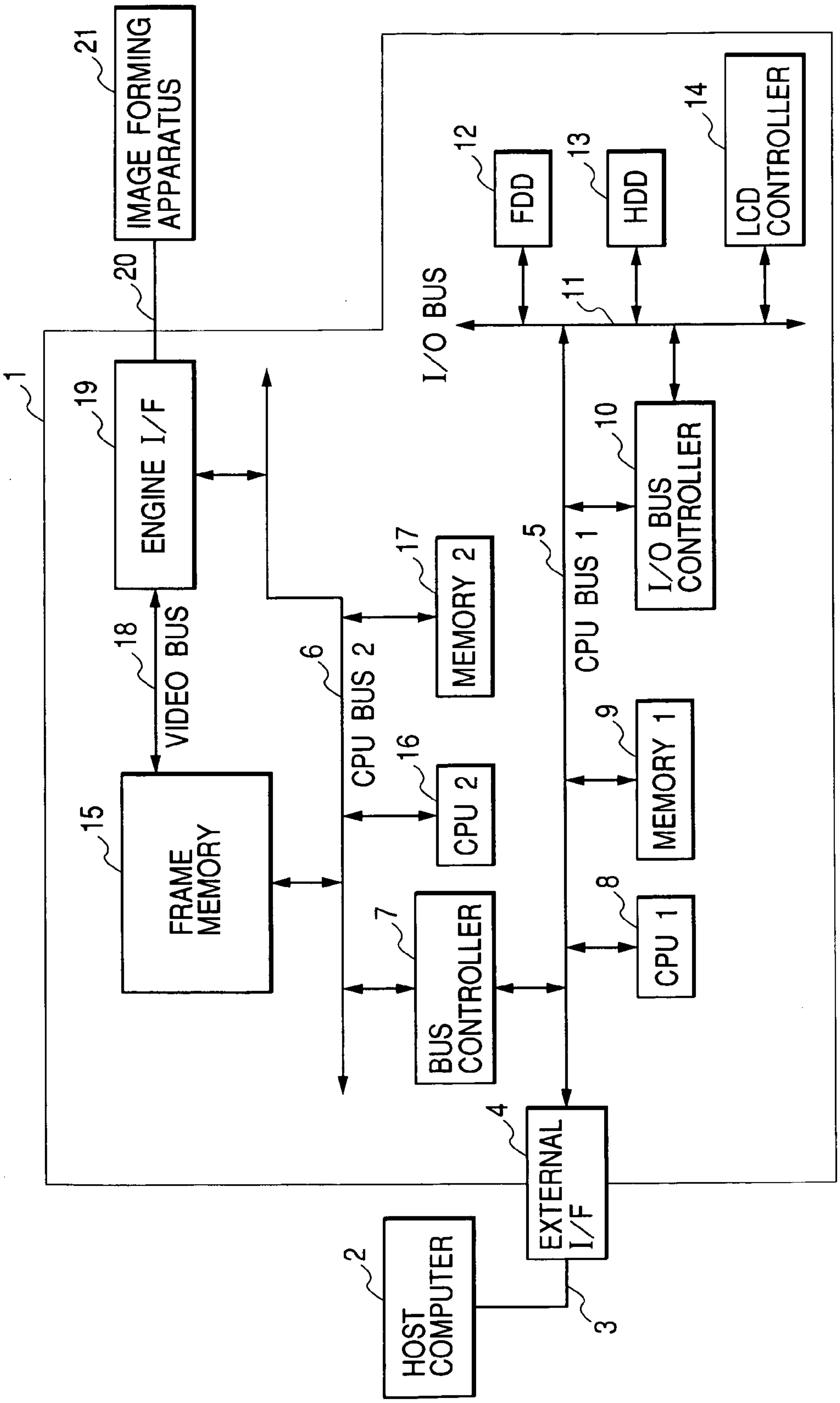
FIG. 1 is a block diagram showing an image processing apparatus.

First, an image processing apparatus will be described with reference to FIG. 1. Reference numeral 1 denotes an image processing apparatus as a main component of the invention. The image processing apparatus 1 includes a printer controller and its internal schematic constructional diagram is shown in FIG. 1. Reference numeral 2 denotes a host computer including a printer driver program. The host computer 2 is connected to the image processing apparatus 1 by an interface cable 3 via an external interface (I/F) 4. An image forming apparatus 21 includes a printer engine and is connected to the image processing apparatus 1 by an interface cable 20 via an engine interface (I/F) 19. Although the image forming apparatus is connected to an outside of the image processing apparatus in the diagram, a similar construction is used even if the image forming apparatus and the image processing apparatus are built in the same casing.

A first CPU 8 controls I/O (input/output) devices other than the image forming apparatus connected to the outside. The external I/F 4 serving as an interface with the host computer 2, a program memory 9, an I/O bus controller 10 for controlling an I/O bus 11, and the like are connected to a first CPU bus 5. A bus controller 7 is also connected to the bus 5 so that it can be coupled with a second CPU bus 6 of a second CPU 16. The second CPU 16 will be explained hereinlater. The I/O bus controller 10 controls a floppy (registered trademark) disk drive (FDD) 12, a hard disk drive (HDD) 13, and an LCD controller 14 connected to the I/O bus 11, and a general I/O such as an operation unit or the like (not shown).

The second CPU 16 controls the image forming apparatus 21 which is connected and, further, develops image data which is stored into a frame memory 15. A second memory 17 is a program memory. A control program is loaded into the second memory 17 from the HDD 13 via the bus controller 7 when a power source of the apparatus is turned on. The second memory 17 is also used for communication with the first CPU 8. The engine I/F 19 is connected to the second CPU bus 6. The image forming apparatus 21 is controlled while performing various settings. A video bus 18 is a bus only for use of an image. The image data which has been developed in the second CPU 16 and stored in the frame memory 15 is sent to the engine I/F 19 via the video bus 18 and, further, transmitted to the image forming apparatus 21.

Figure 2:
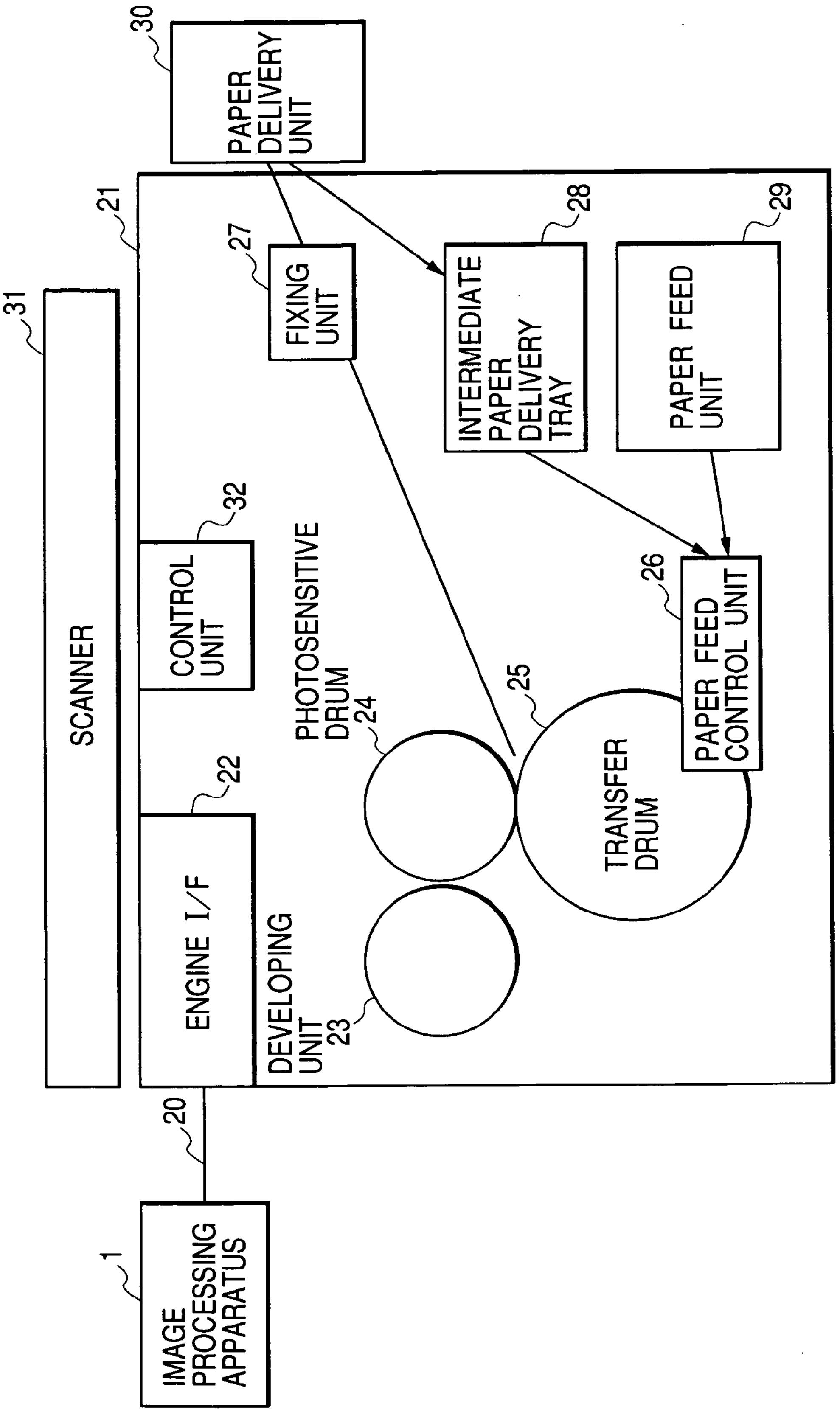
FIG. 2 is a block diagram showing the image processing apparatus.

Subsequently, the image forming apparatus which is connected to the image processing apparatus will be described with reference to FIG. 2. Reference numeral 22 denotes an engine I/F which is connected to the image processing apparatus 1 via the interface cable 20. The image data sent from the image processing apparatus 1 is transferred as a latent image onto a photosensitive drum 24 and developed by a developing unit 23, so that a visible image is formed. In accordance with an instruction from the image processing apparatus 1, a paper feed control unit 26 feeds a sheet (or paper) from a paper feed unit 29 or an intermediate paper delivery tray 28. The fed sheet is wrapped around a transfer drum 25. After that, the image formed on the photosensitive drum is transferred onto the sheet wrapped on the transfer drum 25 and fixed by a fixing unit 27. After the image is fixed, the sheet is delivered to a paper delivery unit 30 or stored onto the intermediate paper delivery tray 28 in accordance with an instruction from the image processing apparatus. Image data read out by a scanner 31 is processed by a control unit 32 and printed in a manner similar to that in the case of the image data sent from the image processing apparatus 1. Although the image forming apparatus of an electrophotographic system has been described in the embodiment, the invention can be also applied to an image forming apparatus of an ink jet system.

Figure 3:
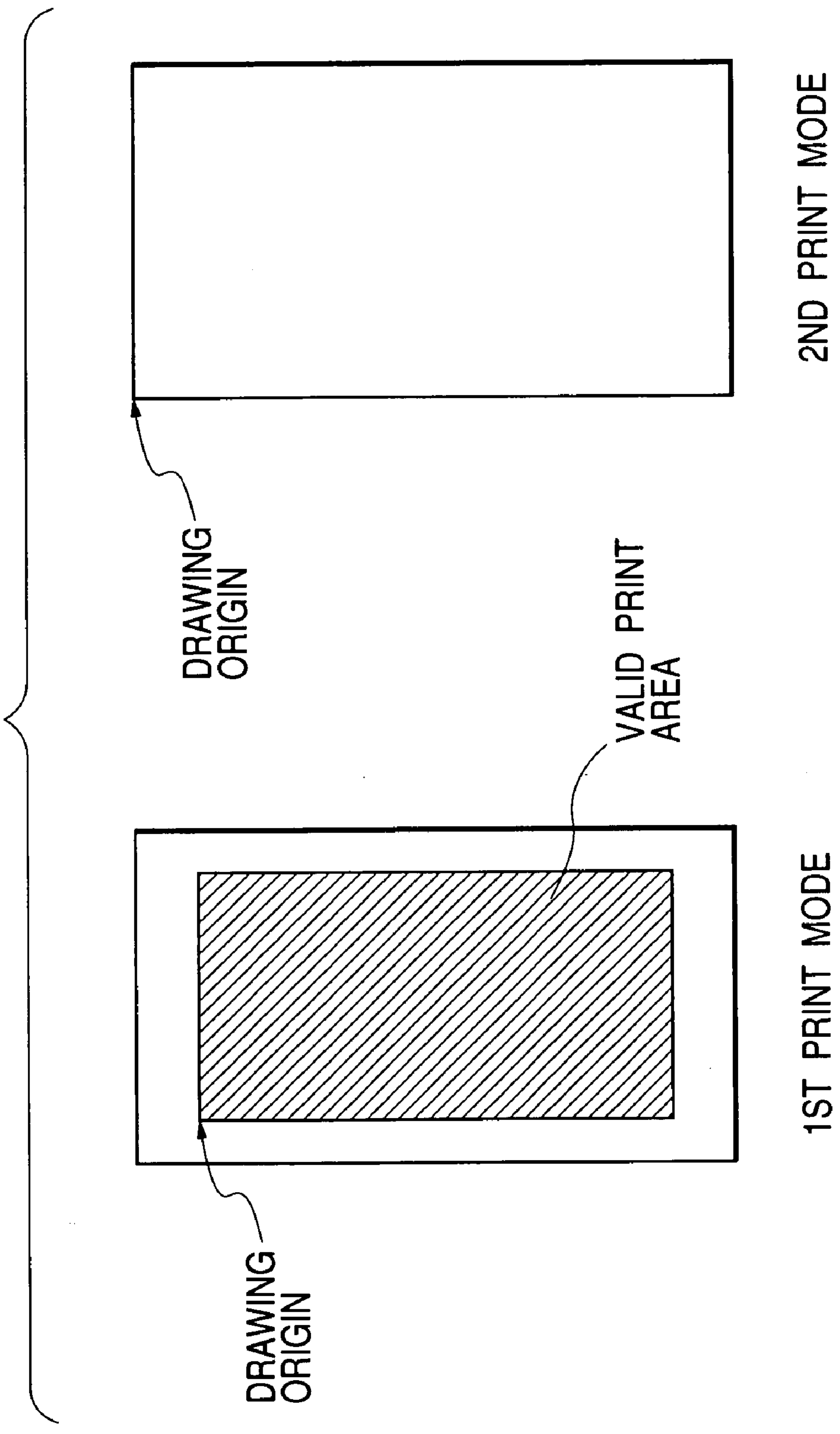
FIG. 3 is a schematic diagram showing layouts in a first print mode and a second print mode.

Subsequently, FIG. 3 is a diagram for explaining a layout in a first print mode in which an area where printing is guaranteed is set to a drawing origin and a layout in a second print mode in which an edge of a physical sheet is set to the drawing origin. In the first print mode, an edge of a valid print area is set to an origin and a draw command is issued. In the first print mode, even in the data formed in the past, a similar output can be obtained. However, even if a printable area is widened in a new print engine, an image cannot be drawn in such an area. On the other hand, in the second print mode, the sheet edge is set to the origin and the draw command is issued. In the second print mode, although there is a case where a missing part of an image occurs in dependence on the printable area that is peculiar to the print engine, if the printable area is widened in a new print engine, more images can be drawn without causing the missing part of the image.

Figure 4:
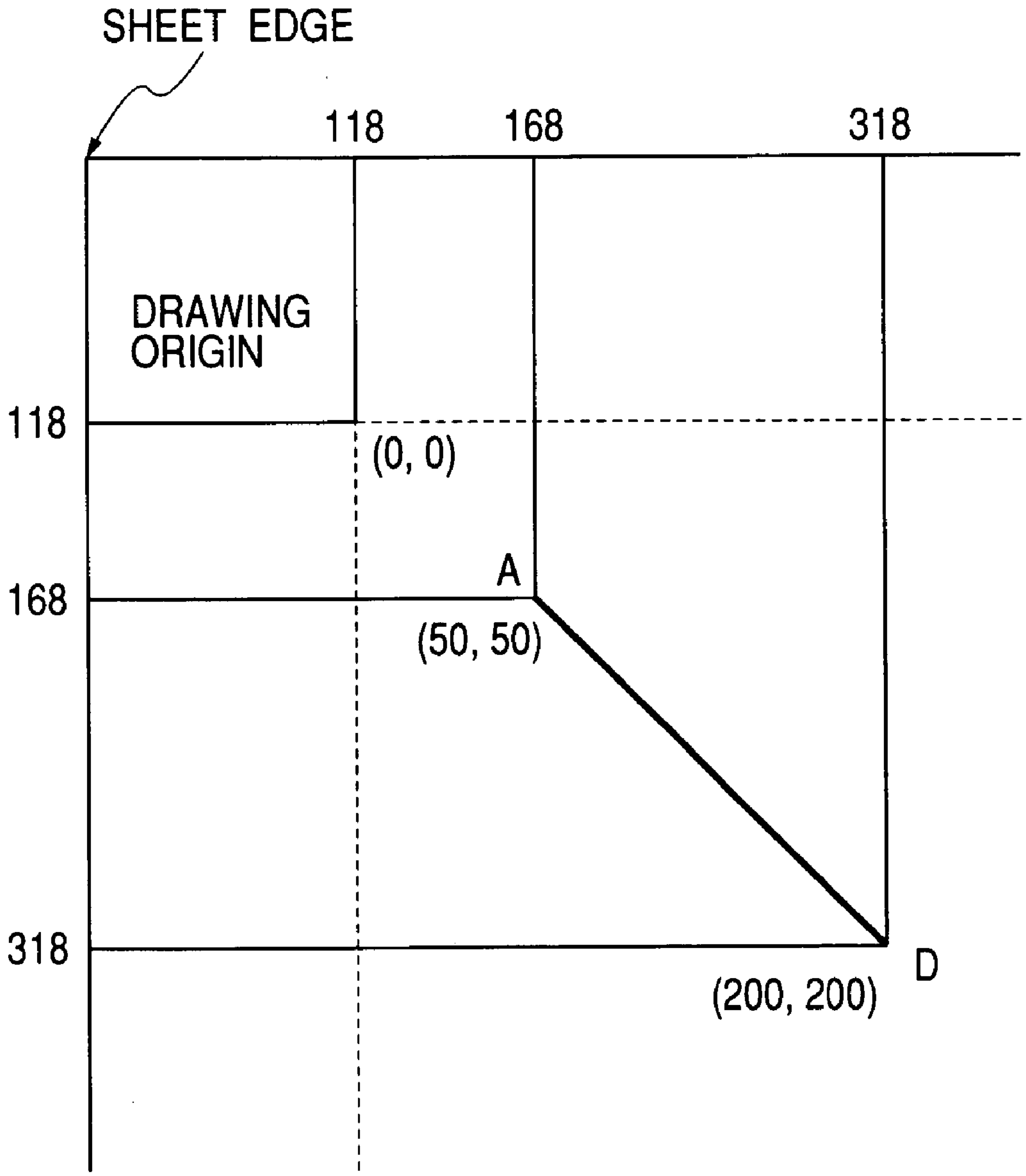
FIG. 4 is a diagram showing details of a designating method in the first print mode.

FIG. 4 is a diagram for explaining in detail a designating method at the time of drawing a line segment in the first print mode. In FIG. 4, in the case where a offset that is peculiar to the print engine is set to X axis=118 dots (corresponding to 5 mm as resolution of 600 dpi) and Y axis=118 dots and a line segment A(168, 168)-B(318, 318) shown in the diagram is designated, the position (118, 118) of the offset is set to the origin and a difference (50, 50)-(200, 200) therefrom is designated. No dot can be drawn in the positions from the sheet edge to 118 dots.

Figure 5:
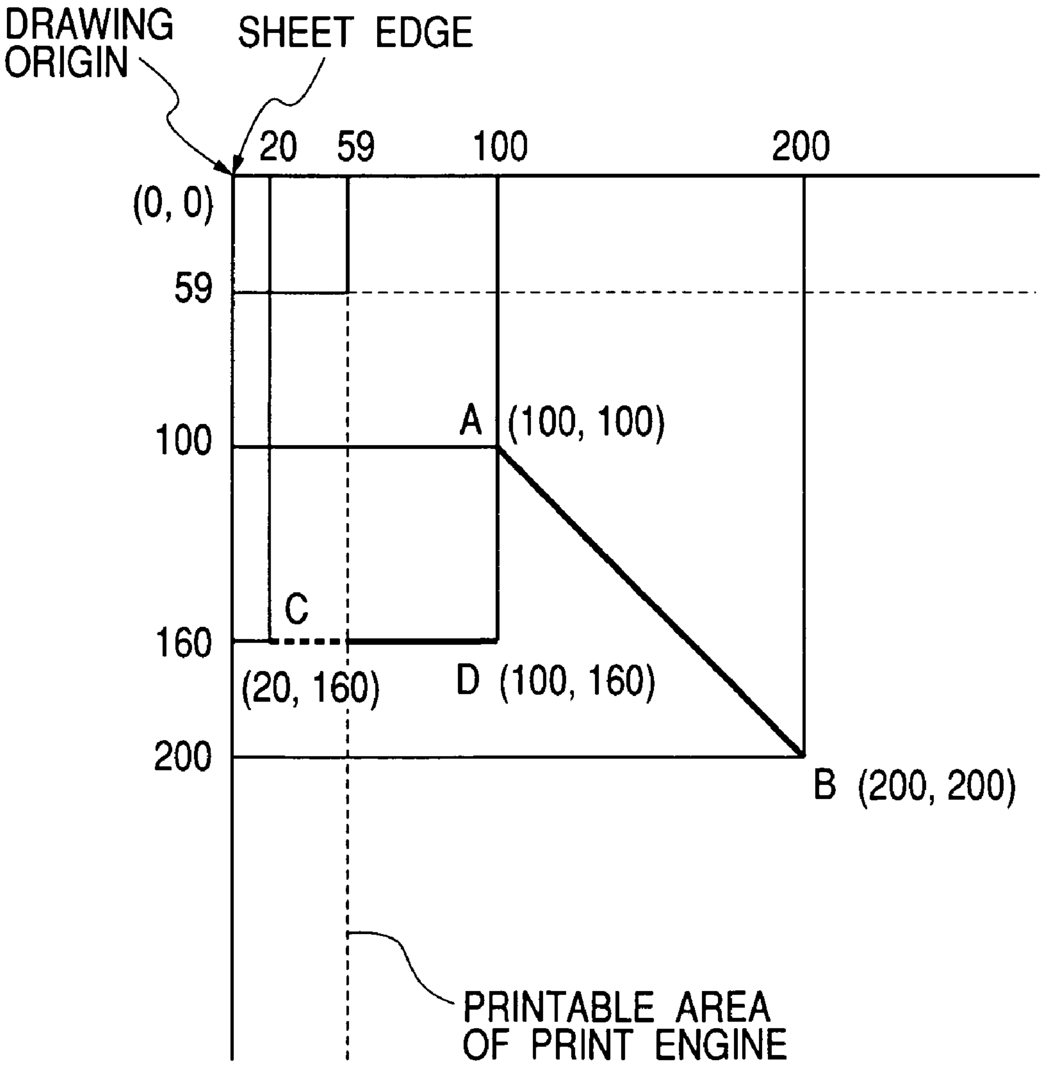
FIG. 5 is a diagram showing details of a designating method in the second print mode.

FIG. 5 is a diagram for explaining in detail a designating method at the time of drawing a line segment in the second print mode. In FIG. 5, in the case where an edge of the printable area that is peculiar to the print engine is set to X axis=59 dots (corresponding to 2.5 mm as resolution of 600 dpi) and Y axis=59 dots (shown by a broken line in the diagram) and two line segments A(100, 100)-B(200, 200) and C(20, 160)-D(100, 160) shown in the diagram are designated, each of them is designated by, the number of dots from the sheet edge. Since the line segment AB is within the printable area that is peculiar to the print engine, all dots can be printed in this area. However, since the line segment CD is out of the printable area that is peculiar to the print engine, no dot is printed in the portions out of the printable area.

Figure 6:
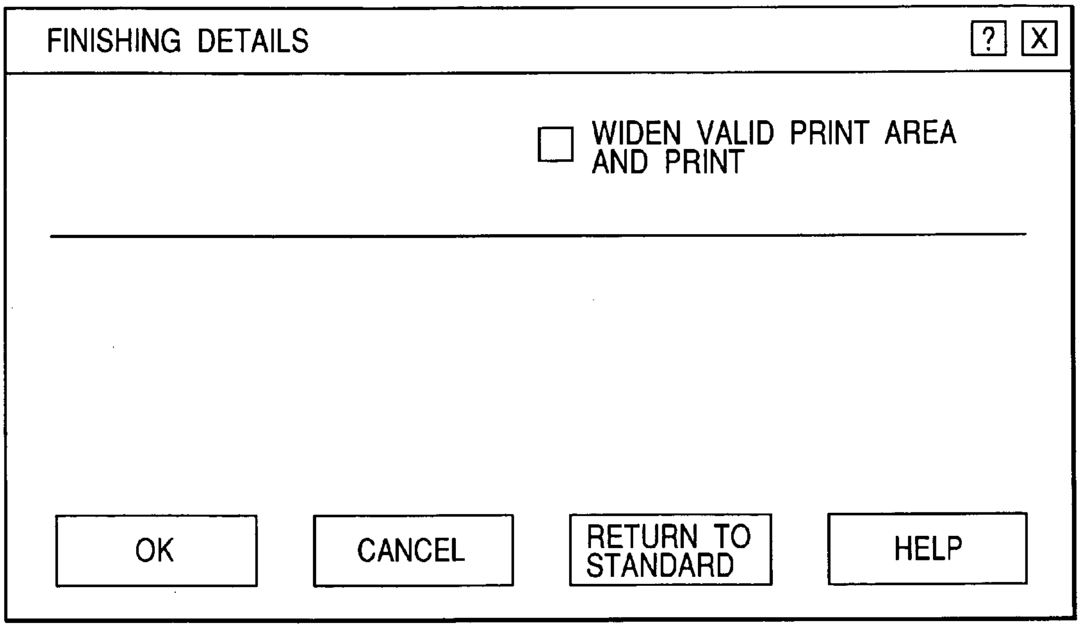
FIG. 6 is a diagram showing an example of a driver UI in an embodiment 1.

FIG. 6 shows an example of a driver UI for switching the first and second print modes by a printer driver of the host computer. In FIG. 6, the first print mode is selected by turning off a check box of "Widen valid print area and print", and the printing without a missing part of an image is guaranteed. The second print mode is selected by clicking the check box of "Widen valid print area and print", thereby enabling dots to be printed to the printable area of the print engine. In the embodiment, a default has been set to a state where the check box of "Widen valid print area and print" is not marked, that is, in the conventional mode.

Figure 7:
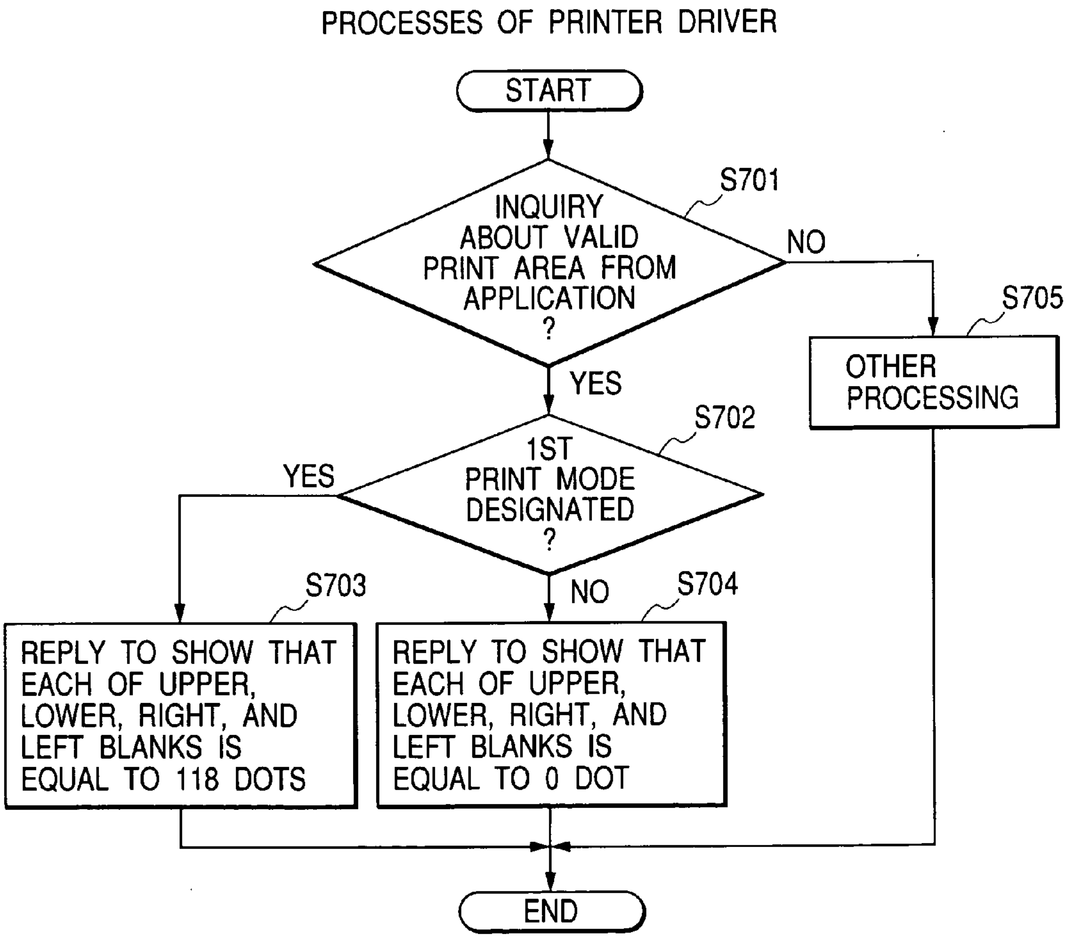
FIG. 7 is a flowchart showing an outline of processes which are executed in the case of printing by setting a center point when a drawing image is larger than a print sheet.

Subsequently, processes of the printer driver program which has been stored in a hard disk of the host computer 2 and is executed by a CPU of the host computer 2 will be explained in accordance with a flowchart of FIG. 7.

First, in step S701, whether a valid print area has been inquired from the application program or not is discriminated. If the valid print area has been inquired from the application program, step S702 follows. If the valid print area is not inquired from the application program, step S705 follows.

Subsequently, in step S702, whether the first print mode has been designated or the second print mode has been designated is discriminated. That is, if the check box "Widen valid print area and print" is not marked, it is determined that the first print mode has been designated. If the check box "Widen valid print area and print" has been clicked, it is determined that the second print mode has been designated. If it is determined in step S702 that the first print mode has been designated, step S703 follows. If it is determined in step S702 that the second print mode has been designated, step S704 follows.

In step S703, a message that each of the upper, lower, right, and left blanks is equal to 118 dots (5 mm) is replied to the application. In step S704, a message that each of the upper, lower, right, and left blanks is equal to 0 dot (0 mm) is replied to the application.

In step S705, for example, the data from the application program is received via a GDI of an operating system and print data such as a PDL (Page Description Language) or the like is formed. In this instance, other processing such as process such that if the check box "Widen valid print area and print" is not marked, the print data to designate the first mode is formed and if the check box "Widen valid print area and print" has been clicked, the print data to designate the second mode is formed or the like is executed.

Figure 13:
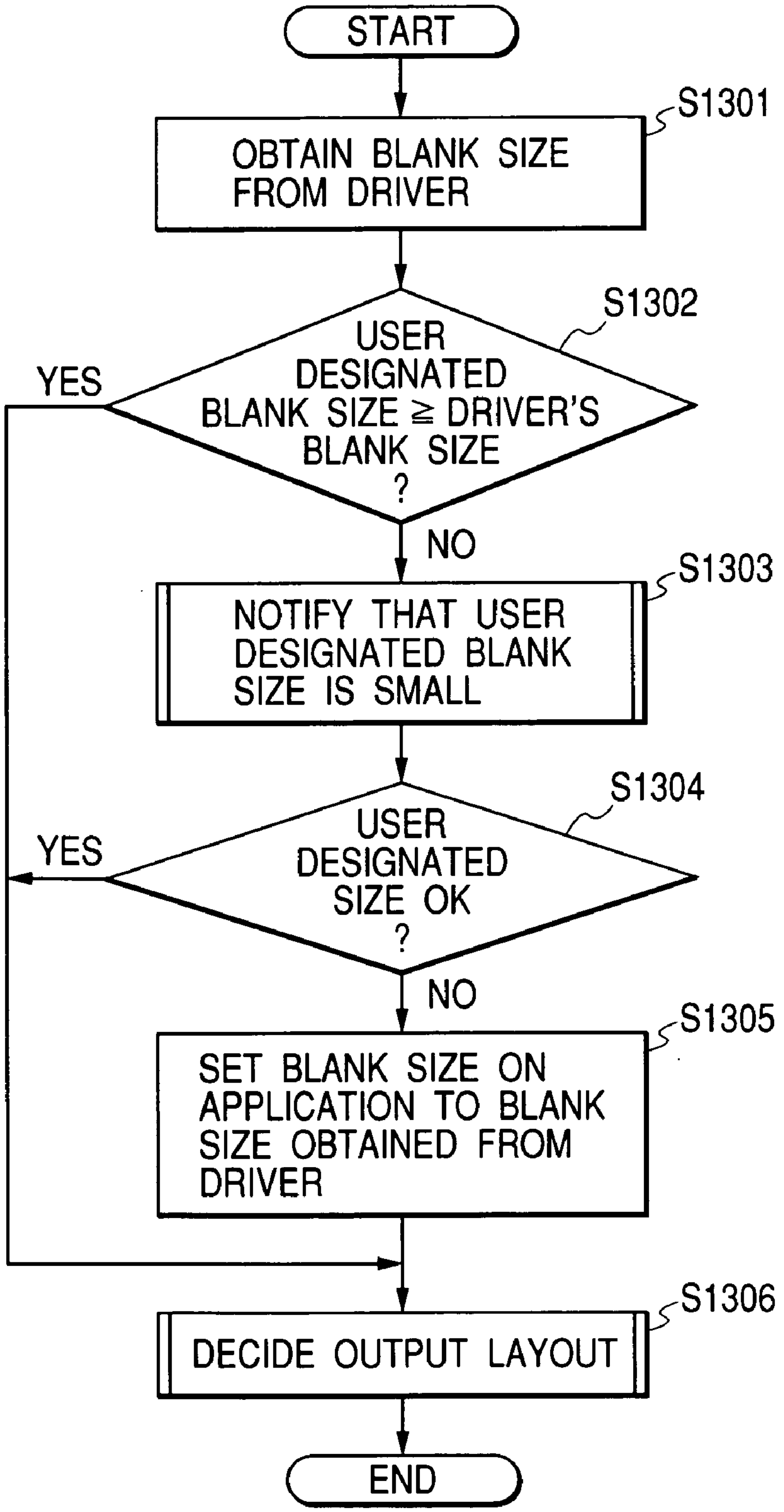
FIG. 13 is a flowchart showing processes of an application.

Subsequently, a difference between the operations of the application due to a difference between the modes in the application in which the blank can be set will be described with reference to FIG. 13. The case where the first print mode has been selected by the printer driver will be described. After that, the difference in the case where the second print mode has been selected will be described.

First, when a blank size of the relevant device is requested to the printer driver by the application in step S1301, 118 dots are notified by the printer driver. Subsequently, in step S1302, a blank size set by the user on the application is compared with the blank size obtained in step S1301. If the blank size set by the user is equal to or larger, a layout is determined in step S1306. If the blank size set by the user is smaller than the blank size notified from the printer driver in step S1302, an alert which allows the user to discriminate whether the set blank size is OK is displayed in step S1303. In step S1304, if the user selects OK, a layout according to the blank size set by the user is determined in step S1306. In this case, a drawing object arranged outside of the blank size notified from the printer driver is not printed. On the other hand, if the user selects cancellation in step S1304, the blank size on the application is changed to the blank size notified from the printer driver in step S1305. The layout is determined in step S1306.

Subsequently, the operation in the case where the second print mode has been selected by the printer driver will be described. If the second print mode has been selected, the blank size which is notified in step S1301 is equal to 0 dot. Therefore, the blank size designated by the user is always equal to or larger in the comparison in step S1302, so that a blank setting alert is not displayed to the user. The drawing object which overflows the valid print area peculiar to the print engine is not printed.

Figure 14:
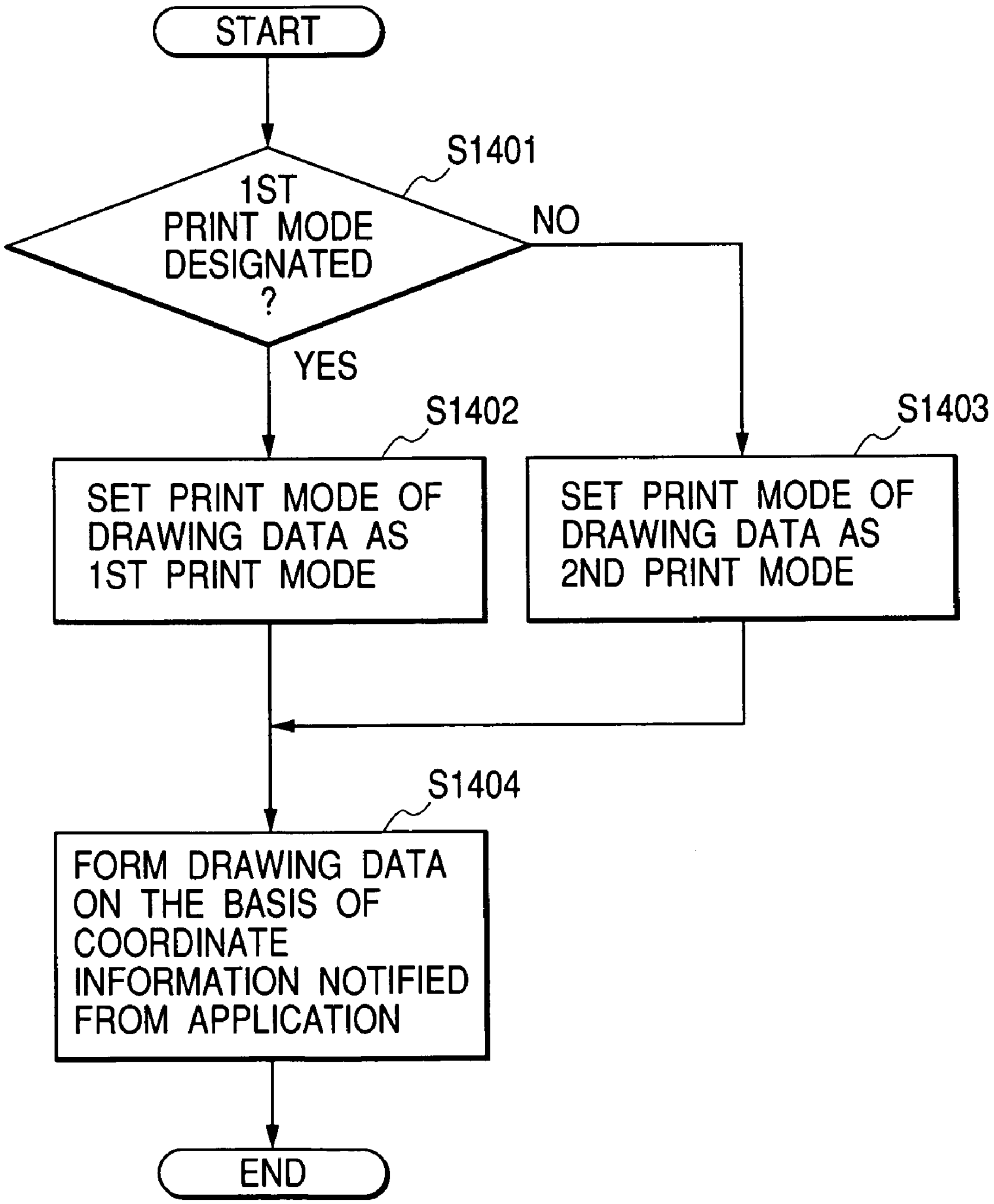
FIG. 14 is a flowchart showing a data forming process of the printer driver.

Subsequently, processes for forming actual drawing data by the printer driver on the basis of drawing information sent from the application will be described with reference to a flowchart of FIG. 14.

The application notifies the printer driver of absolute coordinates on the sheet designated by the user as relative coordinates from the origin on the basis of the origin of the valid print area designated from the printer driver. For example, when the user tries to draw the dot in the position of 236 dots from the sheet edge by the application, the printer driver is notified of the coordinate information as 118 dots in the first print mode and notified of the coordinate information as 236 dots in the second print mode by the application, respectively.

In step S1401, whether one of those modes has been selected on the printer driver UI or not is discriminated. If it is determined in S1401 that the first print mode has been selected, the print mode of the drawing data is set as a first print mode in step S1402. The coordinates notified by the application are used in step S1404. If it is determined in S1401 that the second print mode has been selected, the print mode of the drawing data is set as a second print mode in step S1403. The coordinates notified by the application are used in step S1404. As mentioned above, since the application notifies the printer driver of the relative coordinates from the origin of the valid print area even in any of the print modes, the printer driver can use the coordinate information notified by the application as it is in step S1404.

Figure 15:
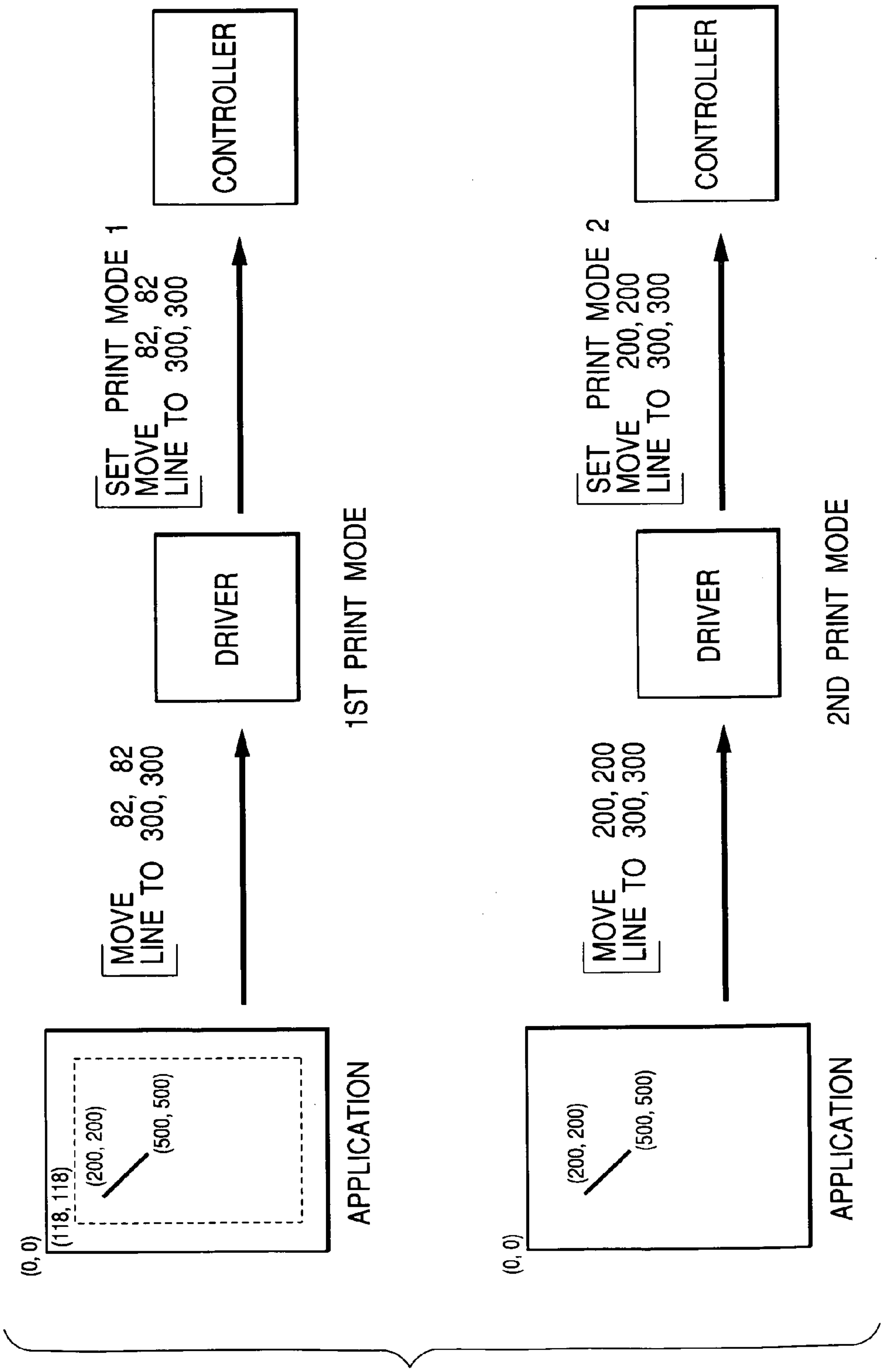
FIG. 15 is a diagram showing commands which are transmitted from the application to the driver and from the driver to the controller.

Commands which are transmitted from the application to the printer driver and from the printer driver to the controller will be described in detail with reference to FIG. 15. The commands shown in FIG. 15 are pseudo commands and their meanings are as defined in FIG. 16.

In both of the first print mode and the second print mode, a straight line is drawn from the coordinates (200, 200) from the sheet edge to the coordinates (500, 500) on the application. In the first print mode, since the printer driver notifies the application that the edge of the valid print area is equal to (118, 118), the application sets (118, 118) to an origin, sets (82, 82) as relative coordinates from such an origin to a start point of a straight line, designates (300, 300) as a difference between the start point and (500, 500) as an end point, forms a command train for drawing the straight line, and transmits it to the printer driver. Since the print mode set at present on the printer driver UI is the first print mode, the printer driver sets the print mode to the first print mode, forms a command train for drawing the straight line, and transmits it to the controller. Subsequently, in the second print mode, since the printer driver notifies the application that the edge of the valid print area is equal to (0, 0), the application sets (0, 0) to an origin, sets (200, 200) as relative coordinates from such an origin to a start point of a straight line, designates (300, 300) as a difference between the start point and (500, 500) as an end point, forms a command train for drawing the straight line, and transmits it to the printer driver. Since the print mode set at present on the printer driver UI is the second print mode, the printer driver sets the print mode to the second print mode, forms a command train for drawing the straight line, and transmits it to the controller.

Figure 8:
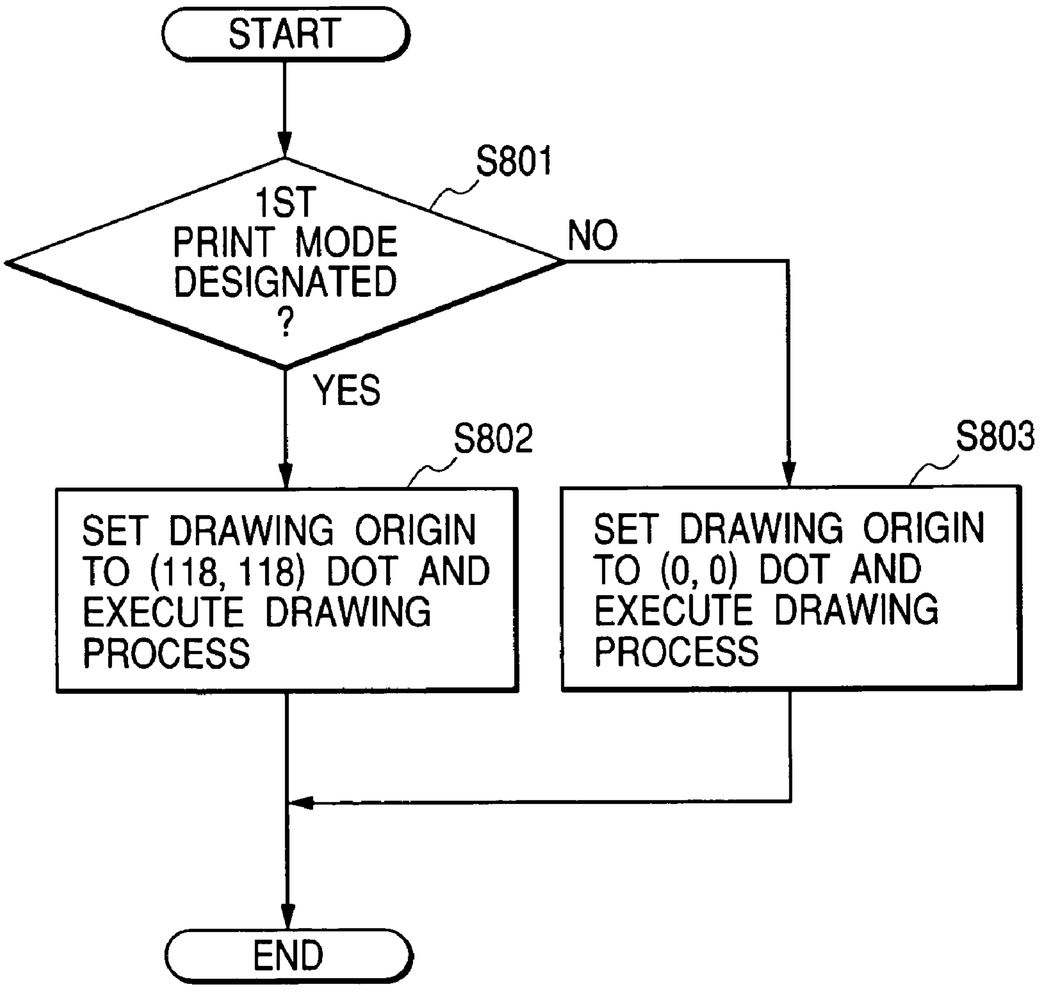
FIG. 8 is a flowchart showing processes which are executed by a printer driver.

Subsequently, processes 1 of the printer controller program which has been stored in the second memory 17 of the image processing apparatus 1 and is executed by the second CPU 16 of the image processing apparatus 1 will be described with reference to a flowchart of FIG. 8.

First, whether the first print mode has been designated in the print data which is transferred from the host computer or not is discriminated in step S801. It can be discriminated because if the check box of "Widen valid print area and print" has been clicked by the printer driver, the print data to designate the second mode is transmitted from the host computer. If it is determined in step S801 that the first print mode has been designated, step S802 follows. A drawing process such that the drawing origin is set to a point of (118, 118) dots, the print data from the host is converted into bit map data (image data), and dots are drawn in the frame memory is executed. If it is determined in step S801 that the second print mode has been designated, step S803 follows. A drawing process such that the drawing origin is set to a point of (0, 0) dot, the print data from the host is converted into bit map data (image data), and dots are drawn in the frame memory is executed.

Since whether the mode "Widen valid print area and print" is set or not can be selected by the printer driver program as mentioned above, it is possible to cope with the blank of 118 dots (5 mm) as a specification of the conventional PDL and the blank of 0 dot (0 mm) as a specification of the new PDL.

When the data is formed by the application via the printer driver corresponding to the conventional PDL and the stored data is printed, the user prints without clicking the check box of "Widen valid print area and print", so that he can print in the state of the layout by which the printing has conventionally been performed.

When the data is formed by the application via the printer driver corresponding to the new PDL, by clicking the check box of "Widen valid print area and print", the user can enlarge the print area and print in correspondence to the blank of the new printer engine.

(Embodiment 2)

In the embodiment 1, it is presumed that the size of print sheet and that of the drawing image are the same in the second print mode. However, when the size of print sheet and that of the drawing image are different (for example, in the case where a frameless image of the A4 size is printed onto a sheet of the B4 size), if the image edge is matched with the origin of the sheet, the sheet edge is not printed due to the blank of the printer engine. In the second embodiment, when the drawing image is arranged, either a mode to match the image with the sheet origin or a mode to match the image with the center point can be selected.

Figure 9:
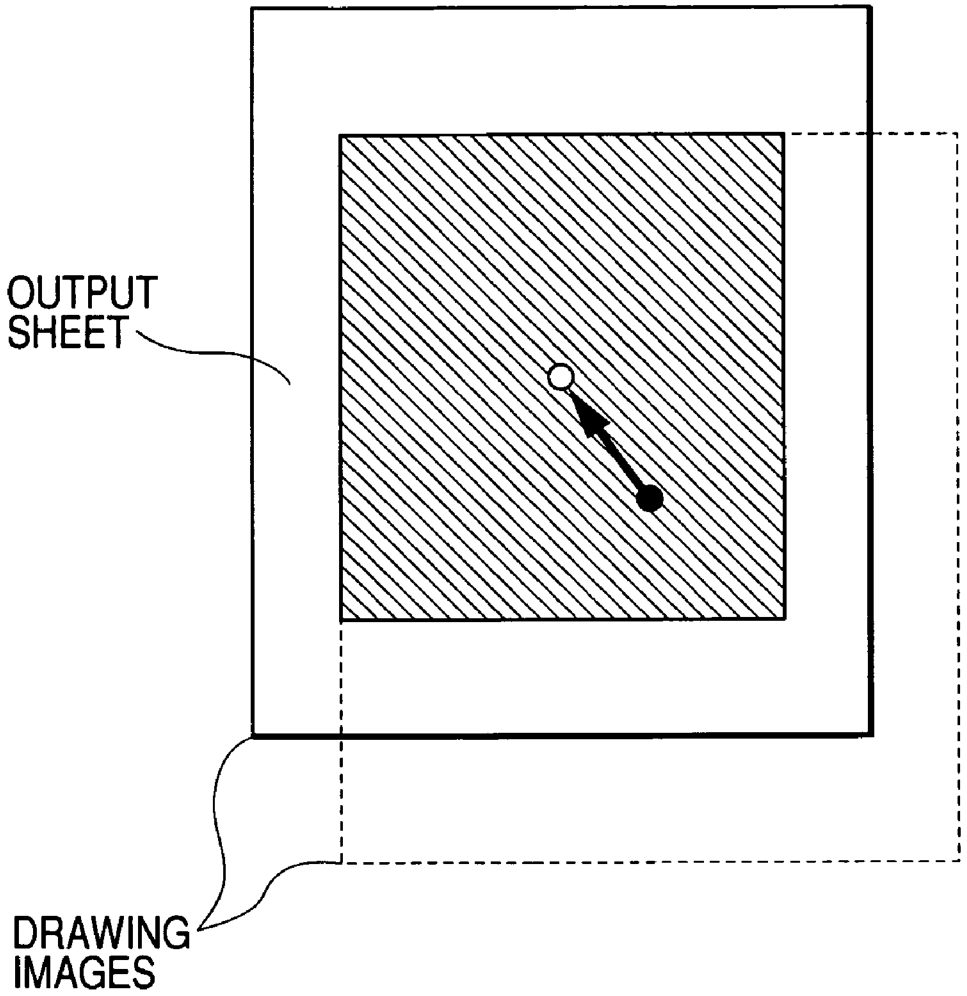
FIG. 9 is a diagram showing a process 1 which is executed by a printer controller.
Figure 10:
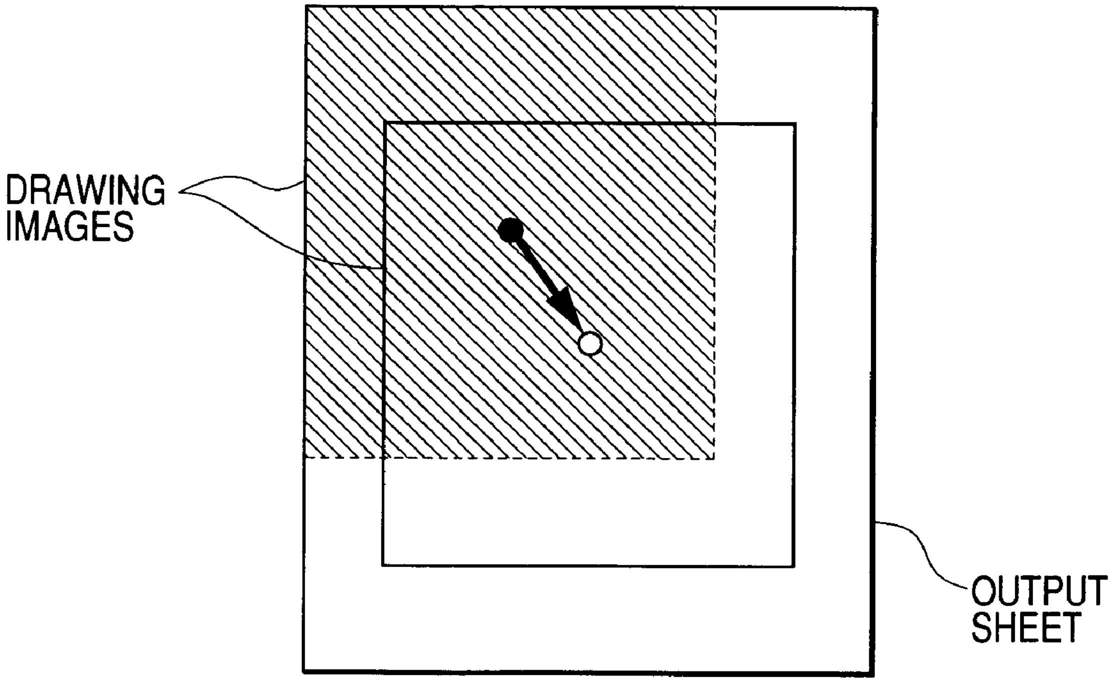
FIG. 10 is a schematic diagram in the case of printing by setting the center point when the drawing image is smaller than the print sheet.

FIG. 9 shows an example in the case where the drawing image is larger than the output sheet. A hatched region corresponds to an output sheet. A case where the image is matched with the sheet edge is shown by a broken line. The drawing image and the center of the output sheet are matched by shifting the drawing image to the upper left position. FIG. 10 shows an example in the case where the drawing image is smaller than the output sheet. A hatched region corresponds to the drawing image. A case where the image is matched with the sheet edge is shown by a broken line. The drawing image and the center of the output sheet are matched by shifting the drawing image to the lower right position.

Figure 11:
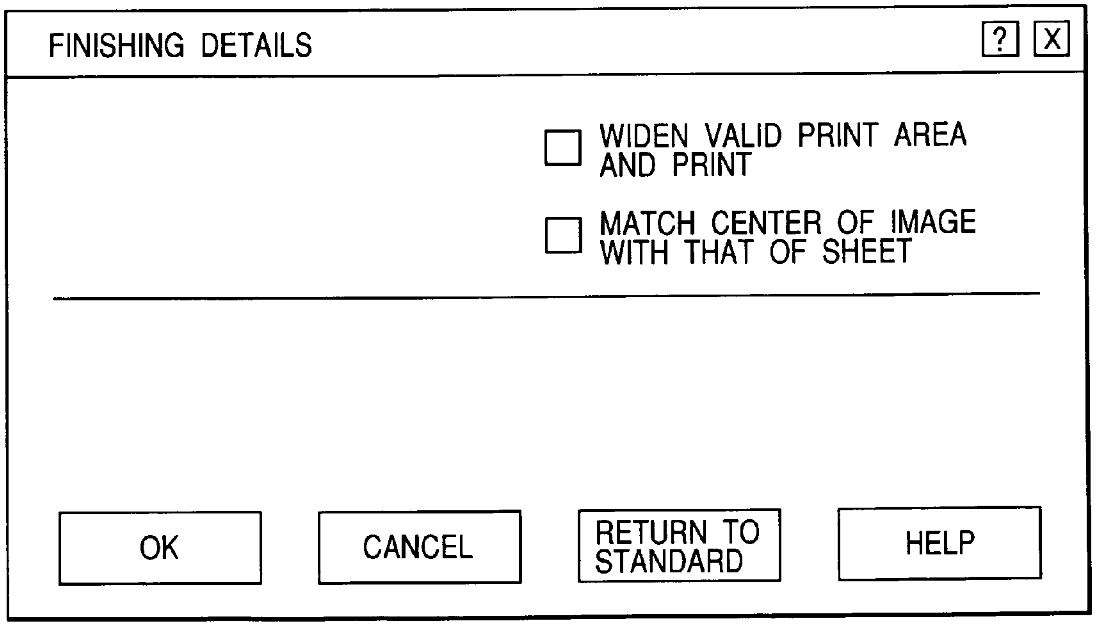
FIG. 11 is a diagram showing an example of a driver UI in an embodiment 2.

FIG. 11 shows an example of the driver UI for switching a mode to match the drawing image with the origin of the print sheet and a mode to match the drawing image with the center point by the host computer. Since the driver UI for switching the first print mode and the second print mode has been described in the embodiment 1, its detailed explanation is omitted here. In FIG. 11, by turning off a check box of "Match center of image with that of sheet", the drawing image and the origin of the print sheet are matched and the printing is executed. By clicking the check box of "Match center of image with that of sheet", the drawing image and the center point of the print sheet are matched and the printing is executed.

Figure 12:
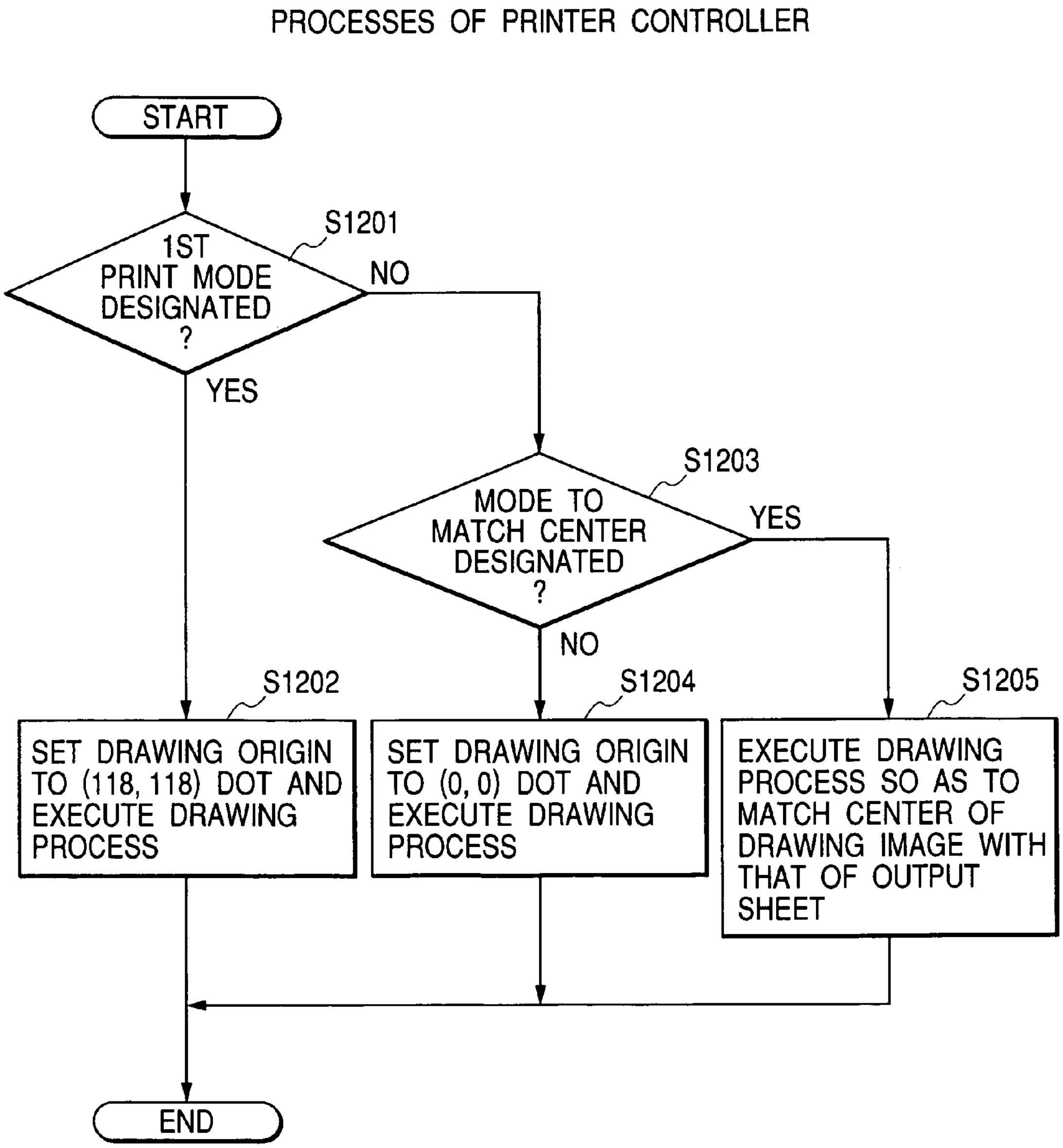
FIG. 12 is a flowchart showing a process 2 which is executed by the printer controller.

Subsequently, processes 2 of the printer controller program which has been stored in the second memory 17 of the image processing apparatus 1 and is executed by the second CPU 16 of the image processing apparatus 1 will be described with reference to a flowchart of FIG. 12.

First, whether the first print mode has been designated in the print data which is transferred from the host computer or not is discriminated in step S1201. It can be discriminated because if the check box of "Widen valid print area and print" has been clicked by the printer driver, the print data to designate the second mode is transmitted from the host computer. If it is determined in step S1201 that the first print mode has been designated, step S1202 follows. A drawing process such that the drawing origin is set to a point of (118, 118) dots, the print data from the host is converted into bit map data (image data), and dots are drawn in the frame memory is executed. If it is determined in step S1201 that the second print mode has been designated, step S1203 follows. Whether the mode to match the image with the center of the sheet in FIG. 11 has been set by the printer driver or not is discriminated. It can be determined because the information showing whether such a mode has been set or not is included in the print data from the host computer.

If it is decided in step S1203 that the mode to match the center is not designated, step S1204 follows. A drawing process such that the drawing origin is set to a point of (0, 0) dot, the print data from the host is converted into bit map data (image data), and dots are drawn in the frame memory is executed.

If it is determined in step S1203 that the mode to match the center has been designated, step S1205 follows. A drawing process is executed so that the center of the drawing image which is drawn on the basis of the print data is positioned to the center of the sheet.

According to the embodiment as described above, in the print system for outputting in accordance with the instruction from the host computer on the network, the system has the first print mode in which the missing part of an image is not caused while taking into consideration of the valid print area of the output sheet and the second print mode in which the image is printed in a range as widely as possible without being conscious with the valid print area and the output modes are switched in accordance with a demand of the user, so that in the case of document printing or slip printing in which importance is attached to the layout, the printing is executed in the first print mode while guaranteeing that the missing part of an image is not caused, and in the case of a CAD or printing of an image or a scan document in which the user wants to print an image in a range as widely as possible, the printing is executed in the second print mode. Consequently, the print image can be outputted in accordance with a demand of the user.

By selecting the first print mode, it is possible to guarantee that the missing part of a print is not caused.

Since the second print mode can be selected, a desired image can be printed to the whole printable area which the print engine has.

Although the example in which a drawing position of a character or a figure is transmitted on a dot unit basis from the application to the driver has been described above, in the case where the drawing position of a character or a figure is transmitted from the application to the driver on a unit basis of a millimeter, an inch, or the like, it is possible that a GDI of the operating system converts the unit of inch or millimeter into the unit of the dot according to the resolution of the printer and the drawing position is transmitted to the printer driver on a dot unit basis, or the printer driver converts the unit of inch or millimeter into the unit of the dot and processes the data, so that the processes can be executed in a manner similar to that mentioned above.

As described above, according to the embodiments of the invention, it is possible to provide the print control apparatus, print control method, print system, and program which can cope with both of the specification of the conventional PDL and the specification of the new PDL.

What is claimed is:

1. An information processing apparatus comprising:

a discrimination unit adapted to discriminate whether a first print mode in which a valid print area is not widened is designated or a second print mode in which the valid print area is widened is designated; and a transmission unit adapted, if said discrimination unit discriminates that the first print mode is designated, to transmit to a printer a command showing that the first print mode is set and a drawing command formed such that drawing positions are represented by coordinates relative to an origin that is defined at a specific position in a print sheet, and if said discrimination unit discriminates that the second print mode is designated, to transmit to the printer a command showing that the second print mode is set and a drawing command formed such that drawing positions are represented by coordinates relative to an origin that is defined at an edge of a print sheet.

2. An apparatus according to claim 1, further comprising a notification unit adapted, if said discrimination unit discriminates that the first print mode is designated, to notify an application that a specific position in a print sheet is set as the origin, and if said discrimination unit discriminates that the second print mode is designated, to notify the application that an edge of a print sheet is set as the origin.

3. An apparatus according to claim 1, wherein the drawing command transmitted by said transmission unit to the printer is formed such that a drawing start position is represented by coordinates relative to an origin that is defined at a specific position in a print sheet and a drawing end position is represented by a difference from the drawing start position, if said discrimination unit discriminates that the first print mode is designated, and formed such that a drawing start position is represented by coordinates relative to an origin that is defined at an edge of a print sheet and a drawing end position is represented by a difference from the drawing start position, if said discrimination unit discriminates that the second print mode is designated.

4. An apparatus according to claim 3, wherein the printer performs drawing processing by setting the specific position in a print sheet as a drawing origin, based on the command showing that the first print mode is set, and performs drawing processing by setting the edge of a print sheet as a drawing origin, based on the command showing that the second print mode is set.

5. An apparatus according to claim 1, wherein the specific position in a print sheet corresponds to a margin of a conventional PDL.

6. An information processing method comprising:

a discrimination step to discriminate whether a first print mode in which a valid print area is not widened is designated or a second print mode in which the valid print area is widened is designated; and a transmission step, if said discrimination step discriminates that the first print mode is designated, to transmit to a printer a command showing that the first print mode is set and a drawing command formed such that drawing positions are represented by coordinates relative to an origin that is defined at a specific position in a print sheet, and if said discrimination step discriminates that the second print mode is designated, to transmit to the printer a command showing that the second print mode is set and a drawing command formed such that drawing positions are represented by coordinates relative to an origin that is defined at an edge of a print sheet.

7. A method according to claim 6, further comprising a notification step, if said discrimination step discriminates that the first print mode is designated, to notify an application that a specific position in a print sheet is set as the origin, and if said discrimination step discriminates that the second print mode is designated, to notify the application that an edge of a print sheet is set as the origin.

8. A method according to claim 6, wherein the drawing command transmitted in said transmission step to the printer is formed such that a drawing start position is represented by coordinates relative to an origin that is defined at a specific position in a print sheet and a drawing end position is represented by a difference from the drawing start position, if said discrimination step discriminates that the first print mode is designated, and formed such that a drawing start position is represented by coordinates relative to an origin that is defined at an edge of a print sheet and a drawing end position is represented by a difference from the drawing start position, if said discrimination step discriminates that the second print mode is designated.

9. A method according to claim 8, wherein the printer performs drawing processing by setting the specific position in a print sheet as a drawing origin, based on the command showing that the first print mode is set, and performs drawing processing by setting the edge of a print sheet as a drawing origin, based on the command showing that the second print mode is set.

10. A method according to claim 6, wherein the specific position in a print sheet corresponds to a margin of a conventional PDL.

11. A computer-executable program stored on a computer-readable median, the program comprising:

discrimination code to discriminate whether a first print mode in which a valid print area is not widened is designated or a second print mode in which the valid print area is widened is designated; and transmission code, if said discrimination unit discriminates that the first print mode is designated, to transmit to a printer a command showing that the first print mode is set and a drawing command formed such that drawing positions are represented by coordinates relative to an origin that is defined at a specific position in a print sheet, and if said discrimination code discriminates that the second print mode is designated, to transmit to the printer a command showing that the second print mode is set and a drawing command formed such that drawing positions are represented by coordinates relative to an origin that is defined at an edge of a print sheet.

12. A computer-executable program stored on a computer-readable medium according to claim 11, further comprising notification code, if said discrimination unit discriminates that the first print mode is designated, to notify an application that a specific position in a print sheet is set as the origin, and if said discrimination code discriminates that the second print mode is designated, to notify the application that an edge of a print sheet is set as the origin.

13. A computer-executable program according to claim 11, wherein the drawing command transmitted by said transmission code to the printer is formed such that a drawing start position is represented by coordinates relative to an origin that is defined at a specific position in a print sheet and a drawing end position is represented by a difference from the drawing start position, if said discrimination code discriminates that the first print mode is designated, and formed such that a drawing start position is represented by coordinates relative to an origin that is defined at an edge of a print sheet and a drawing end position is represented by a difference from the drawing start position, if said discrimination code discriminates that the second print mode is designated.

14. A computer-executable program according to claim 13, wherein the printer performs drawing processing by setting the specific position in a print sheet as a drawing origin, based on the command showing that the first print mode is set, and performs drawing processing by setting the edge of a print sheet as a drawing origin, based on the command showing that the second print mode is set.

15. A computer-executable program according to claim 11, wherein the specific position in a print sheet corresponds to a margin of a conventional PDL.

* * * * *

UNITED STATES PATENT AND TRADEMARK OFFICE

CERTIFICATE OF CORRECTION

PATENT NO. : 7,178,891 B2
APPLICATION NO. : 10/674494
DATED : February 20, 2007
INVENTOR(S) : Takamiya It is certified that error appears in the above-identified patent and that said Letters Patent is hereby corrected as shown below:

COLUMN 3:
Line 50, "a" should read -- an --.

COLUMN 10:
Line 5, "median," should read -- medium, --.

Signed and Sealed this

First Day of April, 2008

JON W. DUDAS
*Director of the United States Patent and Trademark Office*